United States Patent
White et al.

(10) Patent No.: US 12,417,288 B1
(45) Date of Patent: Sep. 16, 2025

(54) SOFTWARE ASSET HEALTH SCORE

(71) Applicant: Wells Fargo Bank, N.A., San Francisco, CA (US)

(72) Inventors: Brian Matthew White, Charlotte, NC (US); Richard Lee Goble, Lee's Summit, MO (US); John Masiliunas, Indianapolis, IN (US); Matthew Thomas McDonald, Callahan, FL (US); Michael Sbandi, Harrisburg, NC (US); Jerry Reynolds, Charlotte, NC (US); Edward J. Patterson, Huntersville, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 219 days.

(21) Appl. No.: 18/163,768

(22) Filed: Feb. 2, 2023

(51) Int. Cl.
*G06F 21/56* (2013.01)
*G06F 21/57* (2013.01)

(52) U.S. Cl.
CPC .......... *G06F 21/568* (2013.01); *G06F 21/577* (2013.01)

(58) Field of Classification Search
CPC .............................. G06F 21/568; G06F 21/577
See application file for complete search history.

(56) References Cited

U.S. PATENT DOCUMENTS

| | | |
|---|---|---|
| 8,117,487 B1 | 2/2012 | Raut et al. |
| 8,448,127 B2 | 5/2013 | Lindley et al. |
| 8,762,188 B2 | 6/2014 | Abercrombie et al. |
| 8,762,987 B1 | 6/2014 | Satish |
| 9,069,967 B2 | 6/2015 | Wysopal et al. |
| 9,542,176 B2 | 1/2017 | Bird et al. |
| 10,055,277 B1 | 8/2018 | Niederman et al. |
| 10,853,489 B2 * | 12/2020 | Savir .......................... G06N 7/01 |
| 11,223,637 B2 | 1/2022 | Neuvirth et al. |
| 11,403,092 B2 * | 8/2022 | Renke ....................... G06F 8/65 |
| 2003/0110067 A1 | 6/2003 | Miller et al. |
| 2008/0263507 A1 | 10/2008 | Chang et al. |

(Continued)

FOREIGN PATENT DOCUMENTS

| | | | |
|---|---|---|---|
| CN | 105095747 A | 11/2015 | |
| WO | WO-2019067627 A1 * | 4/2019 | ............. G08B 19/00 |

OTHER PUBLICATIONS

Calcof et al., "Health modeling and observability of mission-critical workloads on Azure", Microsoft, Feb. 1, 2023, 20 pp., URL: https://learn.microsoft.com/en-us/azure/architecture/framework/mission-critical/mission-critical-health-modeling.

(Continued)

*Primary Examiner* — Christopher A Revak
(74) *Attorney, Agent, or Firm* — Shumaker & Sieffert, P.A.

(57) ABSTRACT

Techniques are described for assessing the health of one or more applications. For example, this disclosure describes a computing device configured to obtain information associated with one or more software assets, wherein the information associated with one or more software assets comprises information associated with a lifecycle of the one or more software assets. The computing device is also configured to compute, based on at least a portion of the information associated with the one or more software assets, a health score that indicates a security risk of the one or more software assets. The computing device is further configured to perform an action based on the health score.

17 Claims, 3 Drawing Sheets

(56) References Cited

U.S. PATENT DOCUMENTS

| | | | |
|---|---|---|---|
| 2010/0192196 A1* | 7/2010 | Lee | G06F 21/55 |
| | | | 726/4 |
| 2012/0317266 A1 | 12/2012 | Abbott | |
| 2014/0173739 A1* | 6/2014 | Ahuja | G06F 21/577 |
| | | | 726/25 |
| 2017/0097623 A1* | 4/2017 | Van Camp | G06Q 50/04 |
| 2018/0129483 A1 | 5/2018 | Biddle et al. | |
| 2020/0210590 A1* | 7/2020 | Doyle | G06F 21/577 |
| 2021/0336984 A1* | 10/2021 | Roytman | H04L 63/1466 |
| 2022/0109689 A1* | 4/2022 | Hamdi | G06Q 10/0635 |
| 2023/0103833 A1* | 4/2023 | Berls | G06N 20/00 |
| | | | 706/61 |
| 2023/0164158 A1* | 5/2023 | Fellows | H04L 63/1441 |
| | | | 726/23 |
| 2023/0336581 A1* | 10/2023 | Dunn | G06F 21/577 |
| 2023/0376481 A1 | 11/2023 | Mayorski et al. | |
| 2024/0193694 A1* | 6/2024 | Griffin | G06Q 40/06 |
| 2024/0231983 A1* | 7/2024 | Phan | G06F 11/0721 |
| 2024/0330479 A1* | 10/2024 | Kamate | G06F 21/577 |

OTHER PUBLICATIONS

Cisco et al., "Cisco DNA Assurance User Guide, Release 2.1.2, Chapter 8", Cisco Systems, Inc., Nov. 6, 2020, pp. 135-154, URL: https://www.cisco.com/c/en/us/td/docs/cloud-systems-management/network-automation-and-management/dna-center-assurance/2-1-2/b_cisco_dna_assurance_2_1_2_ug.html.

Kraemer et al., "A Human Factors Vulnerability Evaluation Method for Computer and Information Security", Proceedings of the Human Factors and Ergonomics Society Annual Meeting, vol. 47, No. 12, Oct. 2003, pp. 1389-1393, Retrieved from the Internet on Apr. 6, 2023 from URL: https://www.researchgate.net/publication/228953472_A_Human_Factors_Vulnerability_Evaluation_Method_for_Computer_and_Information_Security.

Lange et al., "IT Benchmarking Explained: How To Assess Your IT Efforts", BMC, Apr. 5, 2021, 7 pp., URL: https://www.bmc.com/blogs/it-benchmarking-metrics/.

U.S. Appl. No. 18/156,785, filed Jan. 19, 2023, naming inventors Patterson et al.

Office Action from U.S. Appl. No. 18/156,785 dated Jun. 12, 2024, 10 pp.

Notice of Allowance from U.S. Appl. No. 18/156,785 dated Oct. 15, 2024, 9 pp.

Response to Office Action dated Jun. 12, 2024 from U.S. Appl. No. 18/156,785, filed Sep. 11, 2024, 9 pp.

\* cited by examiner

SOFTWARE ASSET HEALTH SCORE

TECHNICAL FIELD

This disclosure relates to computer systems and, in particular, computer systems that assess the health of a software asset or collection of software assets.

BACKGROUND

A software asset or collection of software assets, such as software assets for applications, may be managed by a Software Development Lifecycle (SDLC) management process or an Application Lifecycle Management (ALM) process that may provide a framework by which a software asset or an application is developed, tested, and maintained. The framework for an SDLC/ALM may include various stages, such as processes to set and manage requirements for the development of a software asset/application, set and manage governance and compliance needed across the lifecycle for the software asset/application, establish methodologies to manage and control development, testing, and maintenance of the software asset/application, testing the software asset/application to ensure that the software asset/application meets functionality, performance, usability, and security needs, and/or other processes to develop and maintain the software asset/application.

The health and security risk of a software asset/application are cornerstones of development, particularly in the banking industry and other industries that involve confidential information. An understanding of whether a particular software asset/application or collection of software assets/applications is healthy is important, as is the process by which to remedy vulnerabilities and security risks. Both are important to enable an organization to improve process efficiency (e.g., within the SDLC/ALM).

SUMMARY

In general, this disclosure describes a computing system configured to assess the health of one or more software assets/applications. For example, the computing system may obtain attributes associated with a software asset/application or collection of software assets/applications (e.g., a portfolio or product line of applications) resulting from the lifecycle of the software asset/application, such as information about context and operating environment of a software asset/application, the channel in which the software asset/application operates, the health of that channel, the importance or criticality of the software asset/application, and quality of developer teams that work on the software asset/application. Based on the attributes, the computing system may compute a health score for the software asset/application that indicates, for example, a predicted security risk (or potential security risk) of the software asset/application (or collection of software assets or portfolio/product line of applications. The computing system may use the health score to implement one or more actions to improve process efficiency and/or remediate vulnerabilities or other security risks of the software asset/application.

In one example, this disclosure is directed to a method comprising obtaining, by a computing system, information associated with one or more software assets, wherein the information associated with one or more software assets comprises information associated with a lifecycle of the one or more software assets; computing, by the computing system and based on at least a portion of the information associated with the one or more software assets, a health score that indicates a security risk of the one or more software assets; and performing, by the computing system, an action based on the health score.

In another example, this disclosure is directed to a computing system comprising a memory; and one or more processors in communication with the memory. The one or more processors are configured to obtain information associated with one or more software assets, wherein the information associated with one or more software assets comprises information associated with a lifecycle of the one or more software assets; compute, based on at least a portion of the information associated with the one or more software assets, a health score that indicates a security risk of the one or more software assets; and perform an action based on the health score.

In another example, this disclosure is directed to a computer-readable storage medium comprising instructions that, when executed, cause one or more processors to: obtain information associated with one or more software assets, wherein the information associated with one or more software assets comprises information associated with a lifecycle of the one or more software assets; compute, based on at least a portion of the information associated with the one or more software assets, a health score that indicates a security risk of the one or more software assets; and perform an action based on the health score.

The details of one or more examples are set forth in the accompanying drawings and the description below. Other features, objects, and advantages will be apparent from the description and drawings, and from the claims.

DETAILED DESCRIPTION

Figure 1:
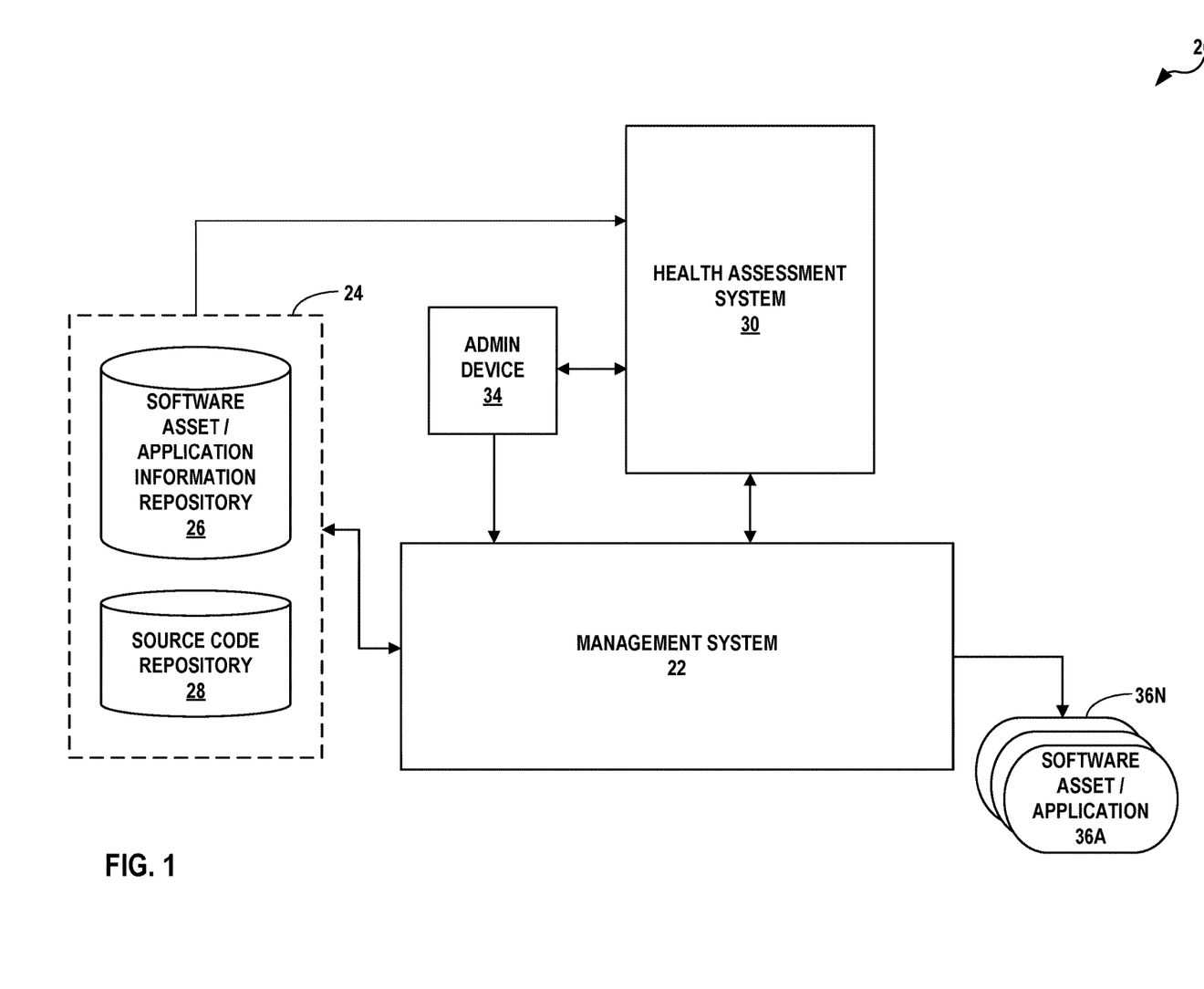
FIG. 1 is a block diagram illustrating an example application health assessment system configured to assess the health of one or more applications, in accordance with the techniques of this disclosure.

FIG. 1 is a block diagram illustrating an example system 20 including an application health assessment system 30 configured to assess the health of one or more applications, in accordance with the techniques of this disclosure. In the illustrated example, system 20 includes an Software Development Lifecycle (SDLC) Management/Application Lifecycle Management (ALM) system 22 (referred to herein as "management system 22") that may represent a tool or system to manage lifecycles for one or more software assets/applications, e.g., software assets/applications 36A-36N (collectively, "software assets/applications 36"). Applications may include one or more software assets. Management system 22 may manage the lifecycle of each software asset/application, which may involve various stages, such as governance (e.g., defining requirements for the application), development, testing and quality assurance, deployment, and maintenance of the software asset/application. For ease of illustration, the techniques described in this disclosure may refer to a software asset or collection of software assets, but may additionally, or alternatively, be applicable to an application or portfolio of applications.

Management system 22 may maintain information associated with software assets/applications 36. The information may correspond to one or more stages of the lifecycle of software assets/applications 36. For example, the information associated with software assets/applications 36 may include information specifying a software asset/application's context and operating environment (referred to herein as "context information"), such as information that specifies the interdependencies of a software asset/application that could have an impact on the software asset/application's risk or control (e.g., the software asset's interdependency with another software asset or collection of software assets based on shared software packages and/or third-party libraries), software infrastructure, touch points of the software asset/application, etc. Information associated with software assets/applications 36 may additionally, or alternatively, include information about a channel in which a software asset/application operates (referred to herein as "channel information") and the health of that channel (e.g., whether a communication channel for the software asset is functioning correctly or has an error). In some examples, information associated with software assets/applications 36 may additionally, or alternatively, include information that specifies the importance or criticality of a software asset/application (e.g., referred to herein as "criticality information") such as the importance or criticality of the software asset with respect to an organization or the importance or criticality of the data used by the software asset (e.g., whether the software asset deals with money or confidential information, whether the software asset is customer-facing, etc.). Applications may have implicit criticality information. Criticality information of an application may also be derived based on the application's connectivity to a product (e.g., collection of software assets) or involvement with a transaction, process, journey, or channel. Information associated with software assets/applications 36 may additionally, or alternatively, include information associated with a custodian of a software asset/application (referred to herein as "custodian information" or "human factors information"), such as information specifying the custodian's contributions to source code of a software asset/application or collection of software assets/applications (e.g., developer that wrote the source code, developer that made updates to the source code, what portion of source code was implemented into the software asset by the developer, etc.), training participated by the custodian (e.g., what type of training, training history, etc.), or the like. Information associated with software assets/applications 36 may additionally, or alternatively, include information on the history and version tracking of the source code for the software asset/application (referred to herein as "history and version information"), such as updates to third-party libraries and/or software packages. Additionally, or alternatively, information associated with software assets/application 36 may include information that specifies a history (e.g., log) of attacks and/or responses to the attacks to software asset/application (referred to herein as "attack history information"). The information described above are merely some examples and may include other information associated with software assets/applications 36. Information associated with software assets/applications 36 may collectively be referred to herein as "software asset/application information."

Management system 22 may store software asset/application information in one or more systems of record, e.g., systems of record 24. Systems of record 24 may comprise a database, file archive, and/or hosting facility that stores source code of a software asset/application and/or source code of third-party libraries (e.g., source code repository 28), history and version tracking of the source code for the software asset/application, vulnerability information that indicates defects of one or more software assets/applications currently (or previously) contained in the product environment (e.g., data from vulnerability testing tools such as static application security testing (SAST), dynamic application security testing (DAST), software composition assurance analysis (SCA), penetration testing tools, etc.), security plan information that describe proper risk assessments, security concerns, etc. per software asset/application, software asset information described above, and/or other information associated with the software asset/application arising from the lifecycle of the software asset/application. In some examples, systems of record 24 may include information from a human resource (HR) system, configuration management database (CMDB) system, security information and event management (SIEM) system, runtime protection data from a web application firewall (WAF), intrusion detection system (IDS)/intrusion prevention system (IPS), an application programming interface (API) policy, information from a security requirements system (e.g., unmet requirements), and/or other vulnerability systems including security scan results (e.g., Qualys, Tanium, and Prisma).

Although illustrated in FIG. 1 as being directly connected to management system 22 and health assessment system 30, in other examples, systems of record 24 may be accessible by management system 22 and health assessment system 30 via one or more private or public networks that may include a wide area network (WAN) (such as the Internet), a local area network (LAN), a virtual private network (VPN)), or another wired or wireless communication network.

In accordance with the techniques described in this disclosure, system 20 includes a health assessment system 30 configured to assess the health of one or more software assets/applications based on the software asset/application information. For example, health assessment system 30 may obtain the software asset/application information, such as from systems of record 24, and assess the health of one or more software assets/applications 36. In some examples, health assessment system 30 may implement an artificial intelligence/machine learning engine ("AI/ML engine") to compute a health score for a software asset/application (or collection of software assets or portfolio/product line of applications) based on at least a portion of the software asset/application information. For instance, health assessment system 30 may input obtained software asset/application information into the AI/ML engine that applies one or more machine learning models (e.g., heuristic model) to the obtained software asset/application information, and outputs a health score for the software asset/application that indicates, for example, a predicted security risk of the software asset/application and/or an aggregate health score for the collection of software assets or portfolio/product line of applications that indicates an aggregate security risk of the collection of software assets or portfolio of applications. In some examples, the health score may indicate a varying degree of the security risk (e.g., high risk, moderate risk, low risk, etc.).

In some examples, health assessment system 30 may perform one or more actions based on the health score. In some examples, health assessment system 30 may invoke an action to generate and send a notification of the health score and/or one or more recommendations to an admin device 34 (e.g., operated by a subject matter expert or manager to remedy the security risk) on how to remediate the security risk. Admin device 34 may be associated with one or more human administrators of management system 20 and/or health assessment system 30. Admin device 34 may comprise any suitable communication or computing device, such as a laptop or notebook computer, desktop computer, a smart phone or tablet, or any other type of computing device capable of communicating with build composition analysis system 30 and/or build server 26 either directly or over a network. As one example, health assessment system 30 may generate and send to admin device 34 one or more recommendations to move developers to different teams (e.g., to teams that work on less critical applications), to modify or implement training procedures, to perform additional testing, to update the source code of the software asset/application or collection of software assets/portfolio of applications, etc. In some examples, if the changes to multiple software assets/applications, networks, and databases in the same maintenance window is too great of a risk, the recommendation may be to re-stage the deployments. In some examples, if the health score is low, health assessment system 30 may recommend revaluating the different architectures of software assets/applications so that risky interactions can be reduced or eliminated. The notification and/or recommendation may represent a message, a user interface element of a user interface for display on a display device (e.g., admin device 34), or any type of indication specifying the health score and/or recommendation. The health score may be indicated numerically (e.g., as a particular value or range), symbolically, along a continuum of values or categories, or in any manner to indicate the security risk of the software asset/application or collection of software assets/portfolio of applications.

In some examples, health assessment system 30 may additionally, or alternatively, invoke an action to deploy controls, such as a rule or policy (e.g., API policy, Web Application Firewall (WAF) rule, etc.) to provide real-time or near real-time protection capabilities (i.e., run-time capabilities), and/or other actions to remedy or prevent the security risk. For example, based on the health score, health assessment system 30 may force failovers, reroute traffic, engage in different load balancing algorithms, quarantine one or more servers, restrict user access, or any other actions. In some examples, health assessment system 30 may additionally, or alternatively, invoke an action to implement bootstrapping protection mechanisms during the build process (e.g., adding internal controls in source code and/or build artifacts). In some examples, different actions to be performed may be based on the severity of the health score.

In some examples, other actions may include policy-driven triggers for surpassing defined health scores by asset or groups of assets, such as the assignment of targeted training related to the type of risk; the prescription of additional security assessments against running/deployed software, during development or prior to software deployments; additional required approvals for deployment of software; automated creation of specific issues (e.g., IssueOps); change of a product alert state; automated enablement of elevated logging/reporting; and automated triggering of more scrutinous testing processes (e.g., fast lane/slow lane continuous integration and continuous delivery/deployment (CI/CD) process switching).

Actions specific to the types of health score increases can trigger prescriptive responses, such as elevated fraud score triggering a business logic and fraud control review, and elevated software security defect score triggering a WAR configuration scan to ensure policy meets baselines and triggering the update (manual or automated) of gaps and misconfigurations. Actions may be based on associated risk by identifying clusters of risk through connected assets and visualizing the risk pockets for manual analysis, or automatically prescribing most cost and risk effective compensating control types and locations to reduce aggregate risk as opposed to remediating the granular risk in individual assets.

As one example operation, health assessment system 30 may obtain information specifying a software asset/application's context and operating environment, such as information specifying a third-party library that was incorporated into software asset/application 36A provides source code of the third-party library and that software asset/application 36A is part of a collection of assets/portfolio of applications that incorporates the third-party library, and information that specifies the attack history and responses, such as information specifying previous versions of the third-party library have required updates to address vulnerabilities. Health assessment system 30 may output a computed health score for software asset/application 36A that indicates, for example, a moderate security risk based on the use of the third-party library that does not publish the source code (e.g., no visibility into the source code of the third-party library) and had previous vulnerability issues. Based on the health score, health assessment system 30 may invoke one or more actions, such as generating and sending a recommendation to incorporate a different third-party library into software asset/application 36A, such as a third-party library that provides visibility into its source code. In some examples, health assessment system 30 may additionally, or alternatively, output a computed health score for a collection of assets or portfolio/product line of applications that also incorporates the third-party library that was incorporated into software asset/application 36A. In this example, health assessment system 30 may, based on the health score, invoke an action to generate and send a recommendation to incorporate a different third-party library into the collection of software assets/portfolio of applications that provides visibility into its source code. In this way, health assessment system 30 may predict security risks, identify other affected software assets/applications, and proactively respond to the security risks to mitigate issues with using a third-party library with a history of vulnerabilities.

As another example, health assessment system 30 may obtain human factors information that specifies a custodian of software asset/application 36A has regularly introduced vulnerabilities or unsecure code into software asset/application 36A and has minimal training, application criticality information that specifies software asset/application 36A is an important software asset/application that deals with money or confidential information, and contextual information that specifies a collection of assets/portfolio of applications within the custody of the custodian. Health assessment system 30 may output a computed health score for software asset/application 36A that indicates a higher security risk (e.g., low health score) based on the coding and training history of the custodian and the criticality of software asset/application 36A. In some examples, health assessment system 30 may additionally, or alternatively, output a computed health score for the collection of assets or portfolio/product line of applications under the custodian that indicates a higher security risk based on the custodian's involvement with the development of the collection of assets/portfolio of applications. Based on the health score, health assessment system 30 may invoke one or more actions, such as generating and sending a recommendation to remove the custodian to less critical software assets/ applications. Additional examples of the use of human factors information to assess the health of an application is described in U.S. patent application Ser. No. 18/156,785, filed Jan. 19, 2023, entitled "ASSESSMENT OF DEVELOPMENT TEAM FACTORS", which is hereby incorporated by reference in its entirety.

Alternatively, if the criticality information specifies software asset/application 36A is not an important software asset/application, health assessment system 30 may, output a health score for software asset/application 36A that indicates a lower security risk (i.e., the health score may be based on the importance of the software asset/application 36A). In this example, health assessment system 30 may generate and send a recommendation (e.g., to a manager of the custodian of application 36A) for additional training for the custodian and/or a notification that the security risk for software asset/application 36A is a lower priority. In this way, health assessment system 30 may predict security risks resulting from the development phase of the software asset/application lifecycle and improve process efficiency in mitigating potential security risks that may result during the software development/application lifecycle.

As a further example, health assessment system 30 may obtain attack history information, e.g., from a Web Application Firewall, that specifies a history (e.g., log) of attacks and/or responses to the attacks to software asset/application 36A. Based on the attack history information, health assessment system 30 may determine a pattern to the attacks and outputs a computed health score for software asset/application 36A that indicates a higher security risk (e.g., low health score). Based on the health score, health assessment system 30 may invoke one or more actions, such as deploying a WAF rule to proactively prevent and/or remedy security risks resulting from software asset/application 36A.

The above are merely examples of different combinations of software asset/application information used by health assessment system 30 to output a computed health score for an software asset/application or collection of software assets/portfolio or product line of applications, and actions that may be performed based on the health score. As described above, health assessment system 30 may compute a health score of a software asset/application and/or collection of software assets/portfolio of applications based on at least a portion of the software asset/application information and/or any combination of the software asset/application information, and based on the computed health score, perform any action to remedy the security risk of the software asset/application and/or collection of software assets/portfolio of applications.

The techniques described in this disclosure may provide one or more technical advantages that realize a practical application. For example, by computing a health score (or potential security risk) of an application or portfolio of applications based on information associated with the application (e.g., information in addition or alternatively to the source code of the application itself), an organization may predict a security risk and proactively mitigate and/or prevent the security risk of the application and/or portfolio of applications that may result from the development or maintenance of the application or portfolio of applications. Moreover, by deploying controls such as policies or rules based on the health score, the system may provide real-time or near real-time protection capabilities, which would conventionally involve updating the source code (e.g., implementing a patch) that typically takes time (e.g., days) to complete.

Health assessment system 30 may comprise a computing system including one or more computing devices or may be a software product running on one or more computing device of a computing system (not shown in FIG. 1). In some examples, the computing system executing health assessment system 30 may be implemented as any suitable computing system, such as one or more server computers, workstations, mainframes, appliances, cloud computing systems, and/or other computing systems that may be capable of performing operations and/or functions described in accordance with one or more aspects of the present disclosure.

Figure 2:
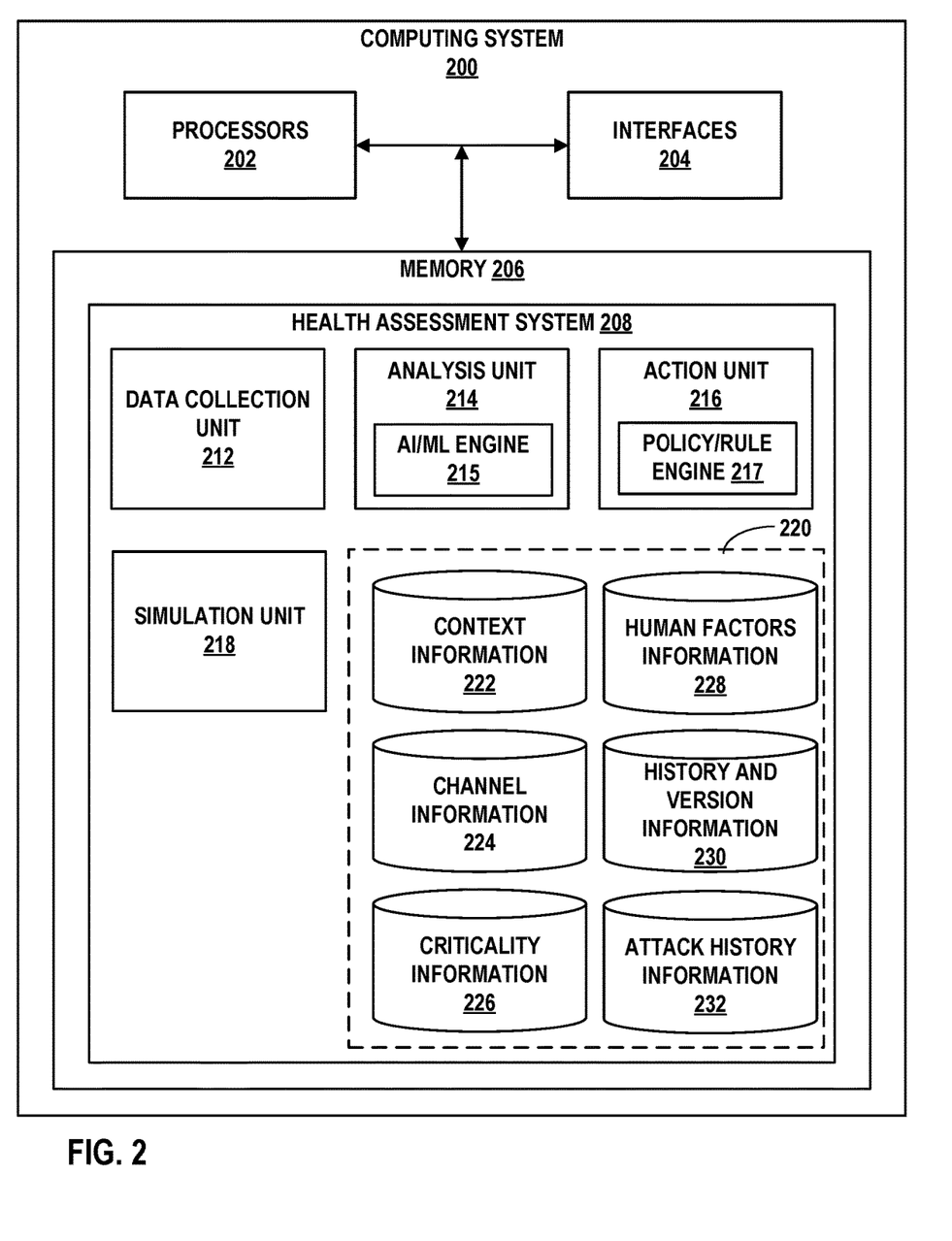
FIG. 2 is a block diagram illustrating an example computing system configured to execute an application health assessment system, in accordance with the techniques of this disclosure.

FIG. 2 is a block diagram illustrating an example computing system 200 configured to support an health assessment system 208, in accordance with the techniques of this disclosure. In some examples, health assessment system 208 may operate substantially similar to health assessment system 30 of FIG. 1. Computing system 200 may, in some examples, serve as an example or alternative implementation of system 20 of FIG. 1.

In the example of FIG. 2, computing system 200 may include one or more computing devices. Computing system 200 includes processors 202, interfaces 204, and memory 206. Memory 206 stores application health assessment system 208 that includes data collection unit 212, analysis unit 214, action unit 216, a simulation unit 218, and/or one or more data repositories 220. As illustrated in FIG. 2, the components, units or modules of computing system 200 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing system 200. For example, processors 202 may be capable of processing instructions stored by memory 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 206 of computing system 200 may store an operating system (not shown) executable by processors 202 to control the operation of components of computing system 200. Memory 206 may also be configured to store information within computing system 200 during operation. Memory 206 may include a computer-readable storage medium or computer-readable storage device. In some examples, memory 206 includes one or more of a short-term memory or a long-term memory. Memory 206 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 206 is used to store program instructions for execution by processors 202. Memory 206 may be used by software or applications running on computing system 200 (e.g., application health assessment system 208) to temporarily store information during program execution.

Computing system 200 may utilize interfaces 204 to communicate with other systems or devices via one or more connections or networks, e.g., data repositories 24 and/or admin device 34 of FIG. 1. Interfaces 204 may be network interfaces (such as Ethernet interfaces, optical transceivers, radio frequency (RF) transceivers, Wi-Fi or Bluetooth radios, or the like), telephony interfaces, application programming interfaces (APIs), or any other type of interface that can send and receive information.

Data collection unit 212 obtains information associated with one or more applications (e.g., applications 36 of FIG. 1). As described above, the information may correspond to one or more stages of the lifecycle of a software asset/application, such as context information, channel information, criticality information, human factors information, history and version information, attack history information, and/or any other information associated with the lifecycle of the software asset/application. For example, data collection unit 212 may obtain software asset/application information (e.g., from one or more systems of record 24 of FIG. 1) via interfaces 204. Data collection unit 212 may obtain software asset/application information on a continuous basis, periodic basis, event-driven basis, or other type of basis, and provide the software asset/application information to other modules or units of health assessment system 208. Data collection unit 212 may store the obtained software asset/application information in one or more data repositories, e.g., data repositories 220, such as in context information 222, channel information 224, criticality information 226, human factors information 228, history and version information 340, and/or attack history information 232.

Analysis unit 214 may assess the health of one or more software assets/applications based on the software asset/application information. For example, analysis unit 214 may include AI/ML engine 215 that applies one or more machine learning models to at least a portion of the obtained software asset/application information. In some examples, the machine learning model may comprise a supervised learning model, unsupervised learning model, semi-supervised model, a reinforcement learning model, or another type of machine learning model. Based on the input of the software asset/application information into the machine learning model, AI/ML engine 215 may identify patterns within the software asset/application information that may indicate possible causes of security risks.

In some examples, computing system 200 may create a machine learning model or modify an existing machine learning model (e.g., in response to input from an operator) to be applied by AI/ML engine 215 via interfaces 204. In some examples, AL/ML engine 215 may receive feedback on computed health scores and/or actions to improve the computation of the health score and/or association of one or more actions with the health score. Based on the feedback, computing system 200 may re-train the machine learning model (e.g., based on additional information derived from input from the operator) to improve the computation of the health score and/or association of the one or more actions with the health score.

Health assessment system 208 includes action unit 216 that generates and executes an action based on a health score. For example, action unit 216 may generate and send a notification of the health score and/or one or more recommendations on how to remediate the security risk. Action unit 216 may generate a message, a user interface element of a user interface for display on a display device, or any notification of the health score and/or recommendation. The health score may be indicated numerically (e.g., as a particular value or range), symbolically, or in any manner to indicate the security risk of the software asset/application or collection of software assets/portfolio of applications.

In some examples, action unit 216 may include a policy/rule engine 217 to deploy controls that provide run-time capabilities to remedy the security risk. Policy/rule engine 217 may comprise a pluggable software component separate from the application code that executes configured policies or rules, such as an API policy, Web Application Firewall (WAF) rule, and/or other controls. In some examples, action unit 216 may perform configurations to a network or other computing system or otherwise control another device or computing system to perform an appropriate action, such as to change the operation of such systems to mitigate risk or perform another action. In some examples, AI/ML engine 215 may further associate one or more actions to a computed health score.

In some examples, health assessment system 208 may include a simulation unit 218 to simulate a software asset/application (e.g., before deployment of the software asset/application) such that analysis unit 214 may compute a health score of the simulated software asset/application (and/or collection of software assets/portfolio of applications) and action unit 216 may perform an action based on the health score. For example, health assessment system 208 may obtain information specifying the simulated software asset/application's context and operating environment, such as information specifying a software package incorporated into the simulated software asset/application that is also incorporated into other software assets/applications, and attack history information, e.g., from a Web Application Firewall, that specifies a history (e.g., log) of attacks and/or responses to the attacks corresponding to the software package incorporated into the other software assets/applications. Health assessment system 30 may output a computed health score for the simulated software asset/application that indicates, for example, a moderate security risk based on the use of the software package that has a history vulnerability issues. Based on the health score, health assessment system 30 may invoke one or more actions, such as generating and sending a recommendation to perform additional testing to the simulated software asset/application. In some examples, health assessment system 30 may additionally, or alternatively, output a computed health score for the other software assets/applications that also incorporates the software package. In this example, health assessment system 30 may, based on the health score, invoke an action to generate and send a recommendation to perform additional testing to the other software asset/application. In this way, health assessment system 30 may predict security risks and proactively respond to the security risks to mitigate and/or prevent potential issues with using a software package with a history of vulnerabilities.

Figure 3:
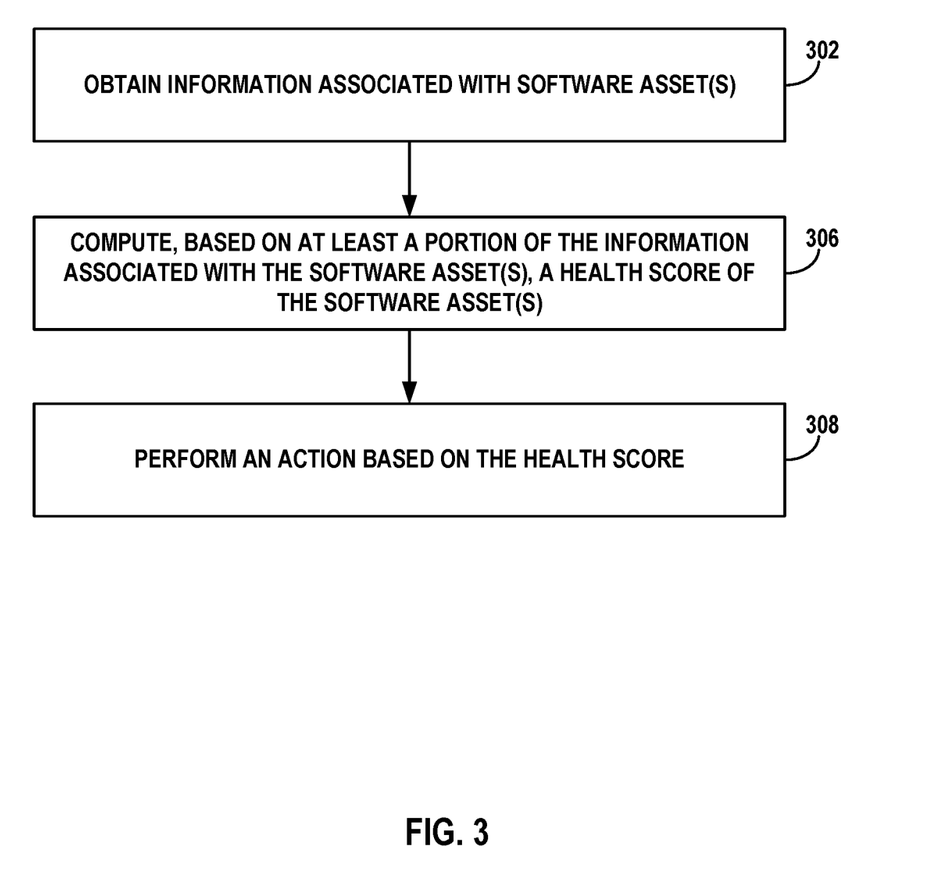
FIG. 3 is a flowchart illustrating an example operation of the application health assessment system, in accordance with the techniques of this disclosure.

FIG. 3 is a flowchart illustrating an example operation of an health assessment system, in accordance with the techniques of this disclosure. For purposes of explanation, the example operation of FIG. 3 is described with respect to health assessment system 30 of FIG. 1 and health assessment system 208 of FIG. 2.

Health assessment system 30 obtains information associated with one or more applications (302). For example, health assessment system 30 may obtain software asset/application information, such as context information, channel information, criticality information, human factors information, attack history information, and/or any other information associated with the lifecycle of the software asset/application.

Health assessment system 30 computes, based on at least a portion of the information associated with the one or more software assets/applications, a health score that indicates a security risk of the one or more software assets/applications (304). For example, health assessment system 30 may implement an AI/ML engine to compute a health score for a software asset/application or a collection of software assets/a portfolio or product line of applications based on at least a portion of the software asset/application information. For instance, health assessment system 30 may input at least a portion of the information associated with the one or more software assets/applications into the AI/ML engine that applies one or more machine learning models (e.g., heuristic model), which outputs a health score for the software asset/application that indicates, for example, a predicted security risk of the software asset/application and/or collection of software assets/portfolio of applications.

Health assessment system 30 performs an action based on the health score (306). For example, health assessment system 30 may invoke an action to generate and send a notification of the health score and/or one or more recommendations on how to remediate the security risk. For instance, a notification and/or recommendation may comprise a message, a user interface element of a user interface for display on a display device (e.g., admin device 34), or any type of indication specifying the health score and/or recommendation. In some examples, health assessment system 30 may additionally, or alternatively, invoke an action to deploy controls, such as a rule or policy (e.g., API policy, Web Application Firewall (WAF) rule, etc.) to provide real-time or near real-time protection capabilities (i.e., run-time capabilities), and/or other actions to remedy the security risk. In some examples, health assessment system 30 may additionally, or alternatively, implement bootstrapping protection mechanisms during the build process (e.g., adding internal controls in source code and/or build artifacts).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

What is claimed is:

1. A method comprising:
    obtaining, by a computing system, information associated with one or more software assets, wherein the information associated with one or more software assets comprises information corresponding to one or more stages of a lifecycle of the one or more software assets;
    predicting, by the computing system and based on a health score determined from at least a portion of the information associated with the one or more software assets, a security risk of the one or more software assets; and
    performing, by the computing system, an action to remediate the predicted security risk of the one or more software assets.

2. The method of claim 1, wherein the information corresponding to the one or more stages of the lifecycle of the one or more software assets comprises information associated with at least one of:
    a development stage of the one or more software assets;
    a testing stage of the one or more software assets; or
    a maintenance stage of the one or more software assets.

3. The method of claim 1, wherein the information associated with the one or more software assets comprises one or more of:
    information specifying context and operating environment of the one or more software assets;
    information about a channel in which the one or more software assets operate;
    information that specifies an importance or criticality of the one or more software assets;
    information associated with a custodian of the one or more software assets; or
    information that specifies a history of attacks and responses to the attacks to the one or more software assets.

4. The method of claim 1, wherein performing the action to remediate the predicted security risk comprises:
    deploying a control that provides run-time capabilities to remediate the predicted security risk.

5. The method of claim 4, wherein the control comprises a policy or rule.

6. The method of claim 1, wherein performing the action to remediate the predicted security risk comprises:
    generating one or more recommendations to remediate the predicted security risk; and
    outputting the one or more recommendations.

7. The method of claim 1, wherein performing the action to remediate the predicted security risk comprises:
    generating a notification specifying the health score; and
    outputting the notification.

8. The method of claim 1, wherein predicting the security risk of the one or more software assets comprises:
    applying a machine learning model to the information associated with the one or more software assets; and receiving an output of the machine learning model indicating the health score.

9. A computing system comprising:

a memory; and one or more processors in communication with the memory, the one or more processors configured to:

obtain information associated with one or more software assets, wherein the information associated with one or more software assets comprises information corresponding to one or more stages of a lifecycle of the one or more software assets;

predict, based on a health score determined from at least a portion of the information associated with the one or more software assets, a security risk of the one or more software assets; and perform an action to remediate the predicted security risk of the one or more software assets.

10. The computing system of claim 9, wherein the information corresponding to the one or more stages of the lifecycle of the one or more software assets comprises information associated with one or more of a development stage, a testing stage, or a maintenance stage of the one or more software assets.

11. The computing system of claim 9, wherein the information associated with the one or more software assets comprises one or more of:

information specifying context and operating environment of the one or more software assets;

information about a channel in which the one or more software assets operate;

information that specifies an importance or criticality of the one or more software assets;

information associated with a custodian of the one or more software assets; or information that specifies a history of attacks and responses to the attacks to the one or more software assets.

12. The computing system of claim 9, wherein to perform the action to remediate the predicted security risk, the one or more processors are configured to:

deploy a control that provides run-time capabilities to remediate the predicted security risk.

13. The computing system of claim 12, wherein the control comprises a policy or rule.

14. The computing system of claim 9, wherein to perform the action to remediate the predicted security risk, the one or more processors are configured to:

generate one or more recommendations to remediate the predicted security risk; and output the one or more recommendations.

15. The computing system of claim 9, wherein to perform the action to remediate the predicted security risk, the one or more processors are configured to:

generate a notification specifying the health score; and output the notification.

16. The computing system of claim 9, wherein to predict the security risk of the one or more software assets, the one or more processors are configured to:

apply a machine learning model to the information associated with the one or more software assets; and receive an output of the machine learning model indicating the health score.

17. A computer-readable storage medium comprising instructions that, when executed, cause one or more processors to:

obtain information associated with one or more software assets, wherein the information associated with one or more software assets comprises information corresponding to one or more stages of a lifecycle of the one or more software assets;

predict, based on a health score determined from at least a portion of the information associated with the one or more software assets, a security risk of the one or more software assets; and perform an action to remediate the predicted security risk of the one or more software assets.

* * * * *